United States Patent [19]
Bianchi et al.

[11] Patent Number: 4,776,930
[45] Date of Patent: Oct. 11, 1988

[54] PROCESS FOR THE PREPARATION OF POTASSIUM NITRATE

[75] Inventors: Angelo Bianchi, Ravenna; Gaetano Calicchio, Chieve, both of Italy; Placido Spaziante, Lugano, Switzerland

[73] Assignee: Enichem Agricoltura S.p.A., Palermo, Italy

[21] Appl. No.: 70,419

[22] Filed: Jul. 7, 1987

[30] Foreign Application Priority Data

Jul. 23, 1986 [IT] Italy .................. 21229 A/86

[51] Int. Cl.$^4$ ................................ C25G 1/00
[52] U.S. Cl. ........................ 204/87; 204/129; 204/91; 204/128; 423/395; 423/438; 423/419 R; 23/295 R; 23/322 R; 23/313 R

[58] Field of Search ............... 204/128, 129, 87, 91; 423/395, 438, 419 R; 23/295 R, 302 R, 313 R

[56] References Cited

U.S. PATENT DOCUMENTS

4,080,270  3/1978  O'Leary ........................... 204/87
4,465,568  8/1984  Dotson et al. ..................... 423/395

FOREIGN PATENT DOCUMENTS

961199  6/1964  United Kingdom ............... 204/87

*Primary Examiner*—R. L. Andrews
*Attorney, Agent, or Firm*—Hedman, Gibson, Costigan & Hoare

[57] ABSTRACT

A process is disclosed for the preparation of potassium nitrate by means of the reaction of nitric acid with potassium carbonate, wherein potassium carbonate is obtained by means of an electrochemical process.

12 Claims, No Drawings

PROCESS FOR THE PREPARATION OF POTASSIUM NITRATE

The present invention relates to a process for the preparation of potassium nitrate from nitric acid and potassium carbonate, with this latter being obtained by means of an electrochemical process.

Most industrially manufactured potassium nitrate is obtained by starting from potassium chloride and nitric acid.

In particular, according to a process of the prior art, potassium chloride and nitric acid are reacted at a high pressure, to yield potassium nitrate according to the reaction scheme:

$$3KCl + 4HNO_3 \rightarrow 3KNO_3 + Cl_2 + NOCl + 2H_2O$$

The nitrosyl chloride byproduct is of no commercial value, and is hence processed for being converted into chlorine and nitrous anhydride, this latter being recycled to the nitric acid production unit.

The related chemical equations are the following:

$$2NOCl + 4HNO_3 \rightarrow 6NO_2 + Cl_2 + 2H_2O$$
$$4NO_2 + O_2 + 2H_2O \rightarrow 4HNO_3$$

According to another process of the prior art, potassium chloride is directly converted into potassium nitrate, in a reaction step operating at room temperature, according to the equation:

$$KCl + HNO_3 \rightleftharpoons KNO_3 + HCl$$

In this process, an organic liquid is used as an extracting agent for the purpose of removing hydrogen chloride and shifting the reaction towards the desired direction.

As relates to such known processes, reference is made in particular to: Southwest Potash Process, Phosphorus and Potassium, 52, March/April 1971, and IMI Process, Phosphorus and Potassium, 52, March/April 1971.

These processes of the prior art are complex and economically burdensome, and to date they have not yet found an adequate commercial diffusion.

On the other hand, difficulties exist in producing a potassium nitrate of adequate purity for being used as fertilizer. For example, its chlorine content must be reduced to zero values, or, at least, to such low values as to be negligible.

A potassium nitrate endowed with such a high purity level is required in fact for being used as fertilizer, e.g., in intensive cultivations, such as of tomato, potatoes, tobacco, citrus and peaches.

The need was hence felt for a process to be available for the production of potassium nitrate, which is simple and cheap, and capable of producing a high-purity potassium nitrate.

Such a need is fulfilled by means of the process of the present invention, according to which potassium nitrate is prepared from nitric acid and potassium carbonate, this latter being obtained by means of a special electrochemical process.

More particularly, according to the present invention, potassium carbonate is prepared by means of a process characterized in that:

a saturated aqueous solution of potassium chloride (anolyte) is fed to the anodic compartment of a membrane cell, which is provided with an anode, a cathode and a perm-selective cation-exchange membrane, interposed between the anode and the cathode, so to form an anodic compartment and a cathodic compartment;

an aqueous solution of potassium carbonate and bicarbonate (catholyte) is fed to the cathodic compartment of said cell;

said anolyte is electrolysed inside said anodic cell compartment, so to cause chlorine gas to be generated at the anode, and potassium ion to migrate from the anodic compartment to the cathodic compartment of the cell through the membrane; from the anodic compartment of the cell a depleted anolyte is discharged, said depleted anolyte is saturated with potassium chloride, and is recycled back to the anodic compartment of the cell;

said catholyte is electrolysed, in said cathodic compartment of the cell, so to cause hydrogen to be generated at the cathode, and thus transform, at least partially, potassium bicarbonate into potassium carbonate; from the cathodic compartment of the cell a potassium carbonate-enriched catholyte is discharged; a portion of said enriched catholyte is treated with nitric acid, for the purpose of forming an aqueous solution of potassium nitrate, and generating carbon dioxide gas; the other portion of said enriched catholyte is contacted with the generated carbon dioxide, in order to convert, at least partially, the potassium carbonate therein contained into potassium bicarbonate and is recycled to the cathodic compartment of the cell;

solid potassium nitrate is recovered from the relevant aqueous solution.

The cell used in the process of the present invention is a cell equipped with an anode and a cathode separated from each other by a perm-selective cationexchange membrane, so to define an anodic compartment and a cathodic compartment.

The anodic compartment contains usually a titanium anode, in the form of an open-structure (either perforated or expanded) sheet, coated with an electroconductive coating endowed with catalytic activity for chlorine generation.

The cathodic compartment usually contains a metal with a low hydrogen overvoltage, such as iron, steel or nickel, in the form of a perforated or expanded sheet.

The cell can consist of a plastic material, such as poly(methyl methacrylate) or polypropylene, and generally has a vertically extended shape, and a rectangular cross section.

The anodic compartment and the cathodic compartment are separated from each other by a cation-permeable membrane, in particular a potassium ion-permeable membrane. The membranes obtained from a copolymer of perfluorosulphonic acid are particularly suitable for the intended purpose. Membranes of this type are known and available from the market, such as, e.g., those marketed by Du Pont (U.S.A.) under the trade mark NAFION.

According to the process of the present invention, to the anodic compartment of the cell an anolyte is sent, which is constituted by a saturated aqueous solution of potassium chloride. In particular, said anolyte can contain potassium chloride at a concentration of the order of 300–320 g/l, and that as a function of the cell operating temperature.

During the electrolysis, at the anode chlorine gas is generated, and potassium ion migrates through the membrane from the anodic compartment to the cathodic compartment, and from the anodic compartment of the cell a potassium chloride-depleted anolyte is discharged.

The conditions are advantageously so adjusted that said depleted anolyte contains potassium chloride at a concentration of the order of 180–200 g/l. Lower concentration values are unacceptable due to the overvoltages they generate in the cell. Higher values are expensive, and in any case do not supply any advantages in cell operation.

The depleted anolyte is separated from chlorine at the outlet from the anodic compartment of the cell, and the so-separated chlorine can be submitted to the usual treatments, such as washing, drying, compression, liquefaction and storage inside suitable containers.

The depleted anolyte is made to flow through a container containing solid potassium chloride, in order to bring the concentration of that salt back to the above indicated saturation values, and is then recycled to the anodic compartment of the cell. If necessary, the anolyte is submitted, before being recycled, to treatments of filtration and removal of the excess of such impurities as sulphate, calcium and magnesium ions.

According to the process of the present invention, to the cathodic compartment of the cell a catholyte is sent, which is constituted by an aqueous solution of potassium carbonate and bicarbonate. Advantageously, this catholyte contains potassium carbonate at a concentration of from 30 to 50% by weight, and potassium bicarbonate at a concentration of from 1 to 8% by weight, and that as a function of the cell operation temperature.

During the electrolysis, at the cathode hydrogen gas is generated, whilst the bicarbonate contained in the catholyte is converted into carbonate.

The conditions are preferably so adjusted that potassium bicarbonate is completely, or substantially completely, converted into carbonate, and a potassium carbonate-enriched catholyte, at a potassium carbonate concentration of approxiamtely 90–95% of the saturation value at the cell operation temperature, is discharged.

However, useful results are still obtained when the catholyte discharged from the cell contains unconverted bicarbonate, or sodium hydroxide.

The potassium carbonate-enriched catholyte is separated from hydrogen at the outlet of the cathodic compartment of the cell, and is then subdivided into two portions.

A portion of the catholyte is contacted with an amount of nitric acid corresponding to the required stoichiometric amount for the formation of potassium nitrate, so to form an aqueou is solution of potassium nitrate.

In this reaction, carbon dioxide gas is generated, which is contacted, e.g., inside a carbonation tower, with the other portion of the enriched catholyte. In this way, a portion of the therein contained carbonate is converted into bicarbonate.

After the restoration of the cell feed conditions, the catholyte is recycled to the cathodic compartment of the same cell.

The operating temperatures of the cell can generally have values comprised within the range of from 50° to 100° C., with values of the order of 60°–80° C. being preferred.

The cell current density is equal to, or higher than, 2,500 A/m², with values of the order of 3,000 A/m² being preferred, and the cell voltage is of the order of 3 V.

By operating under the above indicated conditions, current efficiencies generally higher than 99.8% are accomplished.

As it has been previously said, a portion of the catholyte, enriched with potassium carbonate, is treated with the amount of nitric acid which is stoichiometrically necessary for forming potassium nitrate.

This operation can be carried out by contacting the high-temperature catholyte with nitric acid having a concentration higher than 50% by weight, and generally of the order of 72–100%. Furthermore, this step is carried out under adiabatic conditions, with water being evaporated, and the aqueous solution of potassium nitrate being thus concentrated.

From the so-obtained concentrated solution, solid potassium nitrate crystals can be separated, by means of the customary operations of crystallization, crystal separation and drying thereof. By acting on the crystallization parameters, it is possible to make the crystals grow up to a desired size, usually of the order of 0.5–1 mm.

According to an alternative procedure, the concentrated solution of potassium nitrate can be submitted to a prilling treatment, for the purpose of obtaining a solid product in the form of free-flowing granules, having the desired size.

In any case, a potassium nitrate of exceptionally high purity is obtained.

In the overall, the process of the present invention is simple and convenient.

Besides making it possible to produce a solid potassium nitrate in pure form, the same process makes it possible to obtain a high current efficiency in the electrolysis cell, with a reduced cell voltage. We think that this particularly good result derives, above all, from the fact that to the electrolysis a catholyte of particular composition is submitted, and that the carbonation of potassium carbonate is carried out externally to the cathodic compartment of the electrolytic cell. This, differently from those processes of the known art, wherein potassium carbonate is produced by electrolytic way, with carbon dioxide being directly fed to the cathodic compartment.

The particular operation of the electrolytic cell according to the present invention supplies the additional advantages that particularly pure gaseous electrolysis products are obtained, with the life of the anodes and of the perm-selective membrane being increased.

The following experimental examples are illustrative and not limitative of the present invention.

EXAMPLE 1

A pilot cell is used, which is constituted by an anodic compartment and a cathodic compartment, between which a membrane permeable for potassium ion is interposed.

The anodic compartment has a parallelepipedon, vertically extended, shape and is made from poly(-methyl methacrylate).

The anodic compartment contains furthermore an anode formed by an expanded titanium sheet, of rectangular shape, with dimensions of 50×60 mm, and with a thickness of 1.5 mm, coated wtih a coating endowed with catalytic properties for chlorine generation.

The cathodic compartment has a parallelepipedon, vertically extended, shape and is made from poly(-methyl methacrylate). The cathodic compartment contains furthermore a cathode, in the form of a wire net of AISI 316 stainless steel, of rectangular shape, and with dimensions of 50×60 mm. Said cathodic wire-net does not undergo any pre-treatments.

The anodic compartment and the cathodic compartment are separated from each other by a membrane of NAFION® 325, marketed by Du Pont (U.S.A.), which is treated, immediately before the installation, according to the directions of the supplier company.

The anodic and cathodic compartments are furthermore kept together by two plates (heads) of 90×110 mm of dimensions, of an insulating and rigid material, by means of six cadmium-coated steel bolts. Suitable gaskets provide the tight sealing between the edges of the two compartments and the membrane, and at the same time keep the membrane fastened in its position.

The anodic and cathodic compartments are furthermore provided, in correspondence of their upper and lower surfaces, with two opposite openings, of 3 mm of diameter, respectively for the inlet and the outlet of the anolyte and of the catholyte.

The equipment comprises also an electrical power supply system, with relevant measuring instruments of current intensity, and of voltage drop.

In particular, in the present example, the process is carried out with a current intensity of 10 A, and with a cell voltage of 3 V, to the anodic compartment of 0.55 l/hour being of an anolyte, constituted by an aqueous solution containing 300 g/l of potassium chloride, at a temperature of 60° C. and to the cathodic compartment 0.8 l/hour being fed of a catholyte, constituted by an aqueous solution at 28% by weight of potassium carbonate and at 4.3% by weight of potassium bicarbonate, at a temperature of 60° C.

By operating under these conditions, at the anode 4.1 l/hour of chlorine (evaluated under normal conditions of temperature and pressure) are generated, and an anolite is recovered at a temperature of 65° C., containing 249.5 g of potassium chloride.

This depleted anolyte is contacted with solid potassium chloride, operating at 60° C., so as to restore the feed concentration, and is then recycled to the anodic compartment.

Furthermore, by operating under the above indicated conditions, at the cathode 4.1 l/hour (evaluated under normal conditions of temperature and pressure) of hydrogen are generated, and 0.8 l/hour are recovered of a catholyte, at a temperature of 65° C., containing 32.1% by weight of potassium carbonate, and 0.6% by weight of potassium bicarbonate. 80 ml/hour of this catholyte are treated with 5 ml/hour of nitric acid at 54%, operating at 60° C.

By so doing, 88 ml/hour are obtained of an aqueous solution at 33% by weight of potassium nitrate, from which the solid potassium nitrate is separted by evaporation and crystallization.

In this way, 0.037 kg/hour are obtained of potassium nitrate with a purity of 99.9% and with a chloride content lower than 50 ppm.

During the treatment with nitric acid, as indicated above, of the aqueous solution discharged from the cathodic compartment, 4 l/hour are generated of carbon dioxide, which is contacted, at 40° C., with the residual portion of the aqueous solution discharged from the cathodic compartment, by operating in a tower packed with Raschig rings. In this way, 0.75 l/hour are obtained of a solution containing 29.2% by weight of potassium carbonate, and 4.5% by weight of potassium bicarbonate. This solution, after the addition of water and of potassium carbonate for restoring the feed composition, is recycled to the cathodic compartment of the cell.

By operating under the above indicated conditions, current efficiencies of 99.8% and practically unitary yields of potassium nitrate are obtained.

EXAMPLE 2

The process is carried out analogously to as disclosed in Example 1, with a pilot cell, to whose anodic compartment 10 l/hour are fed of an anolyte at the temperature of 80° C., containing 310 g/l of potassium choloride, and to whose cathodic compartment 26 l/hour are fed of a catholyte, at the temperature of 79° C., which is constituted by an aqueous solution at 38% by weight of potassium carbonate and at 7.2% by weight of potassium bicarbonate.

At the cell outlet, a depleted anolyte is recovered, at the temperature of 88° C., which contains 205 g/l of potassium chloride, and a catholyte is recovered, at the temperature of 86° C., which is constituted by an aqueous solution at 45.7% by weight of potassium carbonate and 1.6% by weight of potassium bicarbonate.

By operating in a similar way to as shown in Example 1, 190 g/hour are obtained of potassium nitrate with a purity of 99.9%, with a chlorine content lower than 50 ppm, with a current efficiency of 99.9%, and with a practically unitary yield relatively to the produced potassium nitrate.

We claim:
1. A process for the preparation of potassium nitrate comprising:
   (a) feeding an anolyte consisting essentially of a saturated aqueous solution of potassium chloride to an anodic compartment of a membrane cell, said cell containing an anode and a cathode separated by a permselective cation-exchange membrane to thereby form said anodic compartment and a cathodic compartment;
   (b) feeding a catholyte consisting essentially of an aqueous solution of potassium carbonate and potassium bicarbonate to said cathodic compartment;
   (c) electrolyzing said anolyte inside said anodic compartment to thereby generate chlorine gas at the anode and to generate potassium ion which migrates from said anodic compartment to said cathodic compartment through said membrane;
   (d) discharging a depleted anolyte from said anodic compartment;
   (e) resaturating said depleted anolyte with potassium chloride and recycling said resaturated anolyte to said anodic compartment;
   (f) electrolyzing said catholyte in said cathodic compartment to thereby generate hydrogen at the cathode and to transform at least a portion of the potassium bicarbonate into potassium carbonate;
   (g) discharging a potassium-carbonate enriched catholyte from said cathodic compartment;
   (h) treating a portion of said enriched catholyte with nitric acid to thereby form an aqueous solution of potassium nitrate and carbon dioxide gas; and
   (i) contacting a second portion of said enriched catholyte with carbon dioxide gas to thereby at least partially convert the potassium carbonate into potassium bicarbonate and recycling said second portion to said cathodic compartment.

2. The process according to claim 1 further comprising recovering solid potassium nitrate from said aqueous solution of potassium nitrate.

3. The process according to claim 2, wherein the step of forming solid potassium nitrate comprises crystallizing or prilling said aqueous solution of potassium nitrate.

4. The process according to claim 1, wherein said anolyte fed into said anodic compartment consists essentially of 300–320 g/l of potassium chloride.

5. The process according to claim 1, wherein said catholyte fed into said cathodic compartment consists essentially of 30%–50% by weight of potassium carbonate and from 1%–8% by weight of potassium bicarbonate.

6. The process according to claim 1, wherein the electrolysis of the anolyte and catholyte is carried out at a temperature within the range of 50°–100° C.

7. The process according to claim 6, wherein the electrolysis of the anolyte and catholyte is carried out at a temperature within the range of 60°–80° C.

8. The process according to claim 1, wherein the electrolysis of said anolyte results in a discharge of said depleted anolyte consisting essentially of 180–200 g/l of potassium chloride.

9. The process according to claim 1, wherein the electrolysis of said catholyte results in a discharge of said catholyte at least substantially free from potassium bicarbonate.

10. The process according to claim 1, wherein electrolysis of the anolyte and catholyte is conducted at a cell current density in the range of 2,500–3,000 A/m$^2$.

11. The process according to claim 10, wherein electrolysis of the anolyte and catholyte occurs at a cell voltage about 3 V.

12. The process according to claim 1, wherein said nitric acid has a concentration in the range of 50%–100%, said nitric acid reacting with said catholyte under adiabatic conditions.

* * * * *